US007393573B2

(12) United States Patent
Dahbura et al.

(10) Patent No.: US 7,393,573 B2
(45) Date of Patent: Jul. 1, 2008

(54) DIRECT MAIL FORMS

(75) Inventors: Anton T. Dahbura, Hagerstown, MD (US); John Flannery, Hagerstown, MD (US)

(73) Assignee: Hub Labels, Inc., Hagerstown, MD (US)

( * ) Notice: Subject to any disclaimer, the term of this patent is extended or adjusted under 35 U.S.C. 154(b) by 131 days.

(21) Appl. No.: 11/057,128

(22) Filed: Feb. 15, 2005

(65) Prior Publication Data

US 2006/0182918 A1 Aug. 17, 2006

(51) Int. Cl.
*B32B 9/00* (2006.01)
*B32B 33/00* (2006.01)
*G09F 3/00* (2006.01)

(52) U.S. Cl. .................... 428/40.1; 428/41.8; 428/42.1; 428/43

(58) Field of Classification Search ................ 428/40.1, 428/42.3, 41.8, 42.1, 43; 283/101, 81, 105
See application file for complete search history.

(56) References Cited

U.S. PATENT DOCUMENTS 4,627,994 A 12/1986 Welsch
4,692,921 A 9/1987 Dahbura et al.
4,807,228 A 2/1989 Dahbura et al.
4,876,131 A * 10/1989 Ashby et al. .............. 428/42.3
4,991,176 A 2/1991 Dahbura et al.
5,006,191 A 4/1991 Schmidt
5,129,682 A * 7/1992 Ashby ......................... 283/81
5,135,789 A 8/1992 Schmidt
5,254,381 A * 10/1993 Hoffmann et al. .......... 428/41.8
5,482,753 A * 1/1996 Langan et al. .............. 428/40.8
5,803,498 A * 9/1998 Tung et al. .................... 283/56
6,149,518 A * 11/2000 Farrow ........................ 462/27
6,572,151 B2 6/2003 Jarvis et al.
6,699,551 B2 3/2004 Roth et al.

* cited by examiner

*Primary Examiner*—Patricia L Nordmeyer
(74) *Attorney, Agent, or Firm*—Jacobson Holman PLLC

(57) ABSTRACT

A direct mail form having a bond paper layer extending across an entire width and length of the form. An adhesive label portion extends across a limited portion of the bond paper layer. The adhesive label portion of the bond paper layer is treated with a silicone release coating prior to application of the adhesive label portion to the bond paper layer. A bottom surface of the bond paper layer is printed prior to application of the silicone layer. The adhesive label portion and remaining free portion of the bond paper layer are subsequently printed with the bond paper layer also being printed prior to application of the silicone layer and adhesive layer portion so that upon removal of the adhesive label portion, printing is exposed.

8 Claims, 22 Drawing Sheets

DIRECT MAIL FORMS

FIELD OF THE INVENTION

The present invention is concerned with an efficient production of direct mail forms including a single layer of bond paper backing for an adhesive label portion having printing on both faces of the bond paper as well as printing on the label portion.

BACKGROUND OF THE INVENTION

The direct mail form industry has a general standard construction for pharmacy "mated" forms. The two primary materials used are a pressure sensitive label stock and bond paper. The two materials are glued together along a lateral edge in-line on press to create a form that the pharmacy can print and peel labels off of one side for application on prescription containers while printing instructions on the bond paper side for insertion into the prescription bag. The glue used is applied from a mounted in line glue gun dispensing a thin bead of either emulsion or hot melt adhesive (glue).

In general, this construction slows press speeds down to 20% efficiency. The glue dispenses at a certain speed. If this speed is changed, the amount of glue will vary causing inconsistencies. The glue is often applied immediately after the two rolls of pressure sensitive label stock and bond paper unwind and before the stock and paper enter the print stations. Often there is printing on the back of these forms.

Some of the problems with this construction start with the difference of material thickness between the single layer of bond or paper material and the multi-layered pressure sensitive material. The pressure sensitive material will tend to try and run faster through the press than the bond material. This can cause the central glued area to separate and the construction to tear in the press. It is also very difficult to turn this material for back printing. Wrinkling is common when doing this, and wrinkling is also due to the different thicknesses in the materials.

The current industry standard construction for non-profit direct mail return address label forms is generally 16 to 18 inches wide of full pressure sensitive stock labels. In many cases, these are two across, so the actual finished size after the form is lasered at a mail shop is 8 or 9 inches wide. Pressure sensitive direct mail forms run very efficiently, 80% to 100% press speed. This business segment is also generally very high volume production.

One of the problems in the industry has been the unavailability of a direct mail mated form producible at high speeds. Direct mail shops separately laser these forms, usually lasering a letter on a bond letter material. Both of these pieces are done on different pieces of equipment in the mail shop and both are personalized. This means that the mail shop will have another process of matching the two personalized pieces together for insertion into an envelope for mailing.

By using the pharmacy label mated process, it is possible to supply the mail shop with a product in which both pieces are lasered at the same time thus eliminating the additional process of matching two disparate pieces of mail before envelope insertion. This could be a potentially tremendous savings and increase in efficiency for the mail shop.

However, production concerns are raised in doing a pharmacy label style mated direct mail form. All of the inefficiencies of a mated pharmacy form would create a major negative issue with direct mail forms. Waste would increase, press down time would increase and production times would be cut by 50% or more.

SUMMARY OF THE INVENTION

By the present invention, the problems of the past involved with gluing two materials together or matching two different pieces of mail together at the end of the printing process have been overcome.

This new process allows printing more efficiently and reduces down time due to web breaks compared to the traditional mated method of gluing two materials together. In most instances, even if a web break occurred, the web break would not entail re-webbing the whole press but just at the end of the printing process. It would also allow printing of both webs simultaneously without a thickness in material variability, therefore increasing print quality.

One option is a possibility of manufacturing the product without any glue. This would eliminate a very serious inefficiency. The following steps would be used.

1. Bond paper is used as a base over the full width of the form (not just one half the width that the mated process uses).

2. An ultraviolet (UV) silicone release coating is laid down as a flood coat on the label side only (one half the width) of the bond paper.

3. Pressure sensitive stock is used. The liner of the pressure sensitive stock is removed and the face stock with adhesive is laminated to the silicone side of the form only. This creates the desired result without gluing or mating two materials together. The form is then die cut and, waste removed to complete the mechanical aspect of the form.

Accordingly, it is an object of the present invention to produce a direct mail form having a bond paper layer extending across an entire width and length of the form and having an adhesive label portion extending across a limited portion of the bond paper layer.

It is another object of the present invention to produce a direct mail form having a bond paper layer extending across an entire width and length of the form and having an adhesive label portion extending across a limited portion of the bond paper layer with the adhesive label portion of the bond paper layer being treated with a silicone release coating prior to application of the adhesive label portion to the bond paper layer.

It is still yet another object of the present invention to produce a direct mail form having a bond paper layer extending across an entire width and length of the form and having an adhesive label portion extending across a limited portion of the bond paper layer with the adhesive label portion of the bond paper layer being treated with a silicone release coating prior to application of the adhesive label portion to the bond paper layer and having a bottom surface of the bond paper layer printed prior to application of the silicone layer and having the adhesive label portion and remaining free portion of the bond paper layer subsequently printed.

It is still yet another object of the present invention to produce a direct mail form having a bond paper layer extending across an entire width and length of the form and having an adhesive label portion extending across a limited portion of the bond paper layer with the adhesive label portion of the bond paper layer being treated with a silicone release coating prior to application of the adhesive label portion to the bond paper layer and having a bottom surface of the bond paper layer printed prior to application of the silicone layer and having the adhesive label portion and remaining free portion of the bond paper layer subsequently printed with the bond paper layer being printed prior to application of the silicone layer and adhesive layer portion so that upon removal of the adhesive label portion, printing is exposed.

These and other objects of the invention, as well as many of the intended advantages thereof, will become more readily apparent when reference is made to the following description taken in conjunction with the accompanying drawings.

DETAILED DESCRIPTION OF THE PREFERRED EMBODIMENTS

Figure 1:
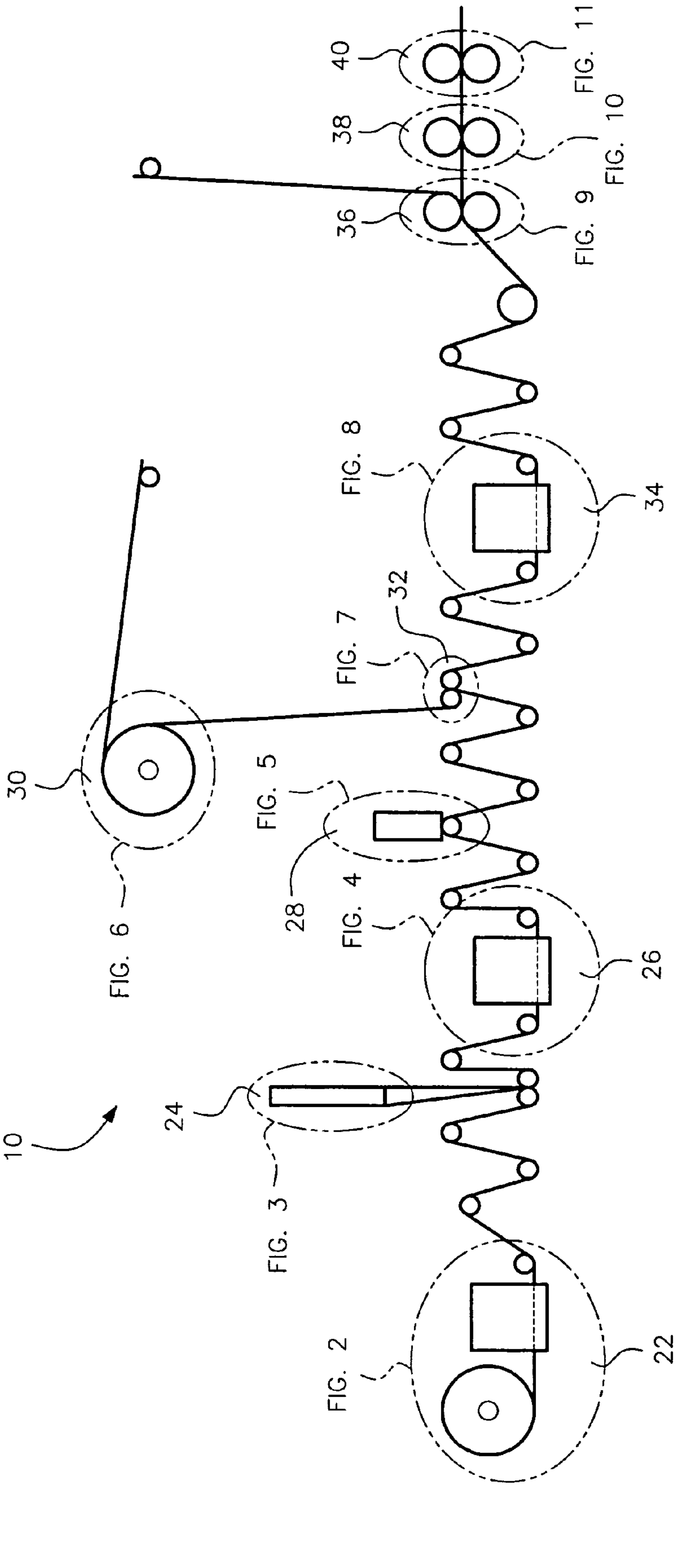
FIG. 1 is a schematic view of the various steps of forming the direct mail form according to the process of the present invention.

In describing a preferred embodiment of the invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar purpose.

With reference to the drawings, in general, and to FIG. 1 in particular, a method of producing a direct mail form by an in-line manufacturing process is generally designated as 20. With reference to FIG. 1, the process includes a paper web roll and initial printing step 22, followed by a turn bar web reversal step 24. A portion of one side of the web is printed at step 26. The printed portion of the web is passed through a silicone release layer application station 28. A pressure sensitive adhesive label is unwound at step 30. The pressure sensitive adhesive label is applied to the web on top of the silicone release layer at station 32. Both the pressure sensitive adhesive label and the remaining open portion of the web are printed at station 34. The pressure sensitive adhesive label is die cut and waste removed at station 36. Marginal perforations on opposite sides of the web are introduced at station 38. Lateral and longitudinal perforations are introduced at station 40 where the finished web including a plurality of direct mail form segments are removed from the in-line manufacturing assembly.

Figure 2:
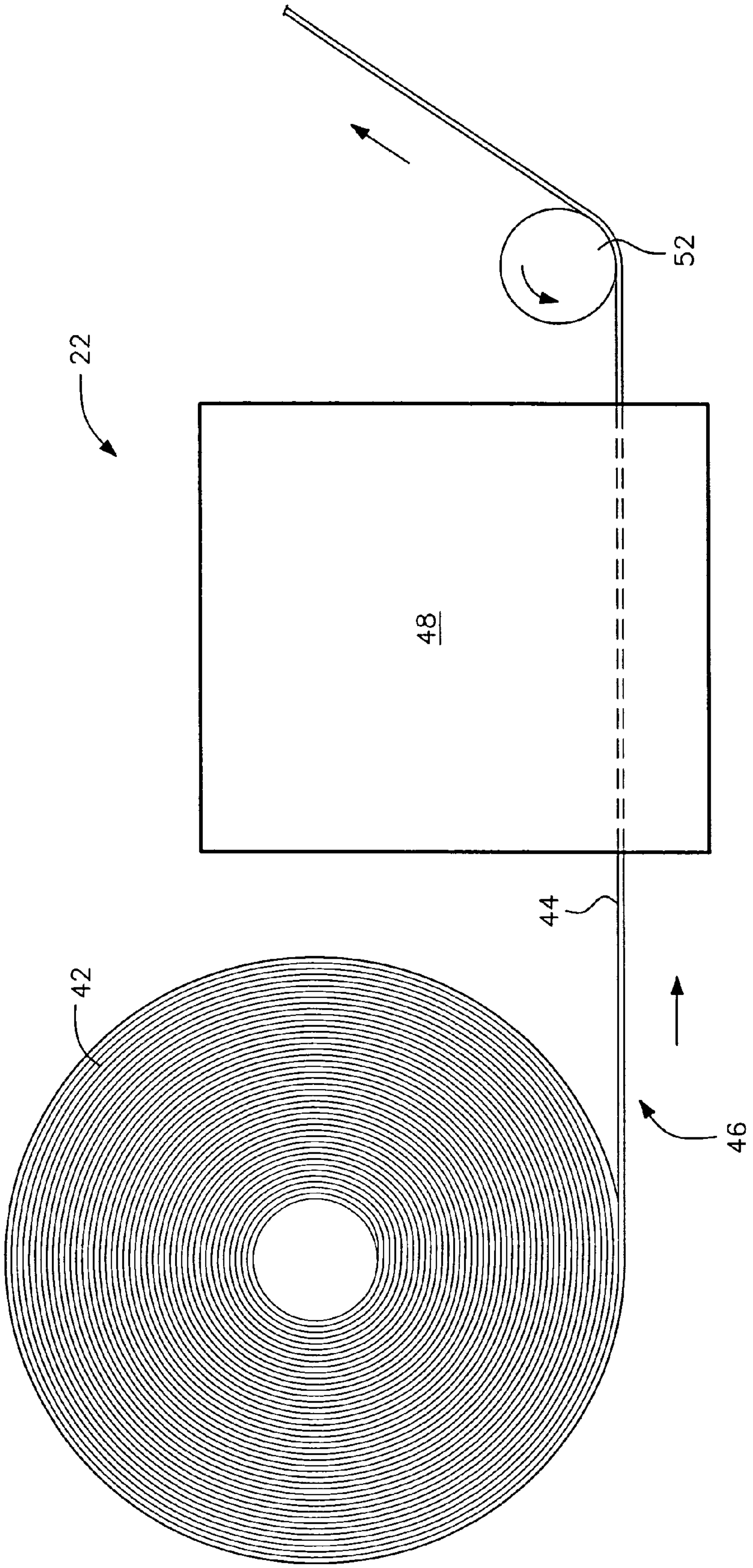
FIG. 2 is an enlarged view of the encircled area labeled as FIG. 2 in FIG. 1.
Figure 2A:
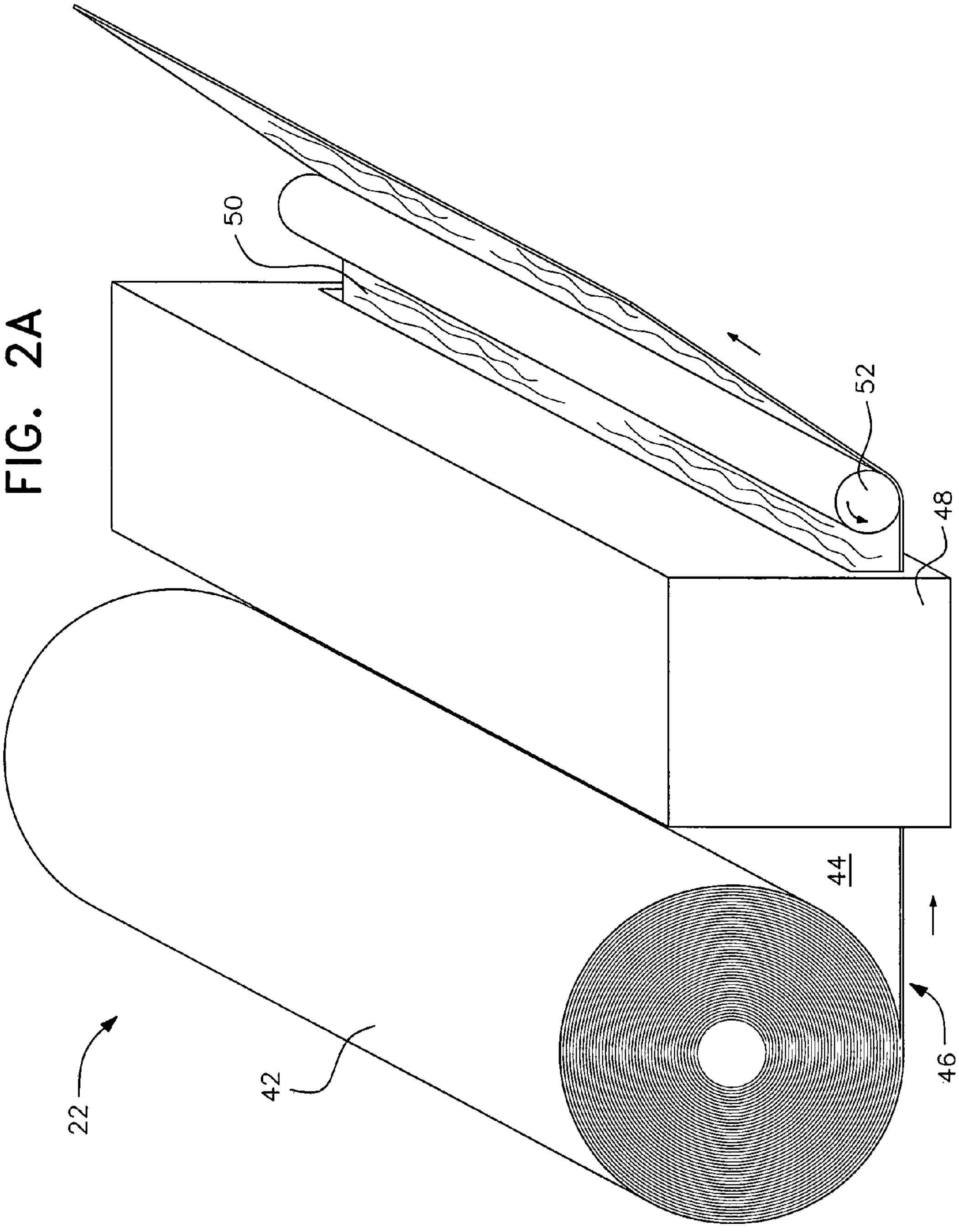
FIG. 2A is a perspective view of the process step illustrated in FIG. 2.

As shown in greater detail in FIGS. 2 and 2A, a roll 42 of 60, 70 or 80 pound bond paper having an overall width up to 20 inches is unwound. A surface 44 of web 46 is printed at printing station 48 with indicia 50. Indicia 50 is located across the entire width of the web 46. The web 46 then continues along a series of guide rollers 52 to turn bar station 24.

Figure 3:
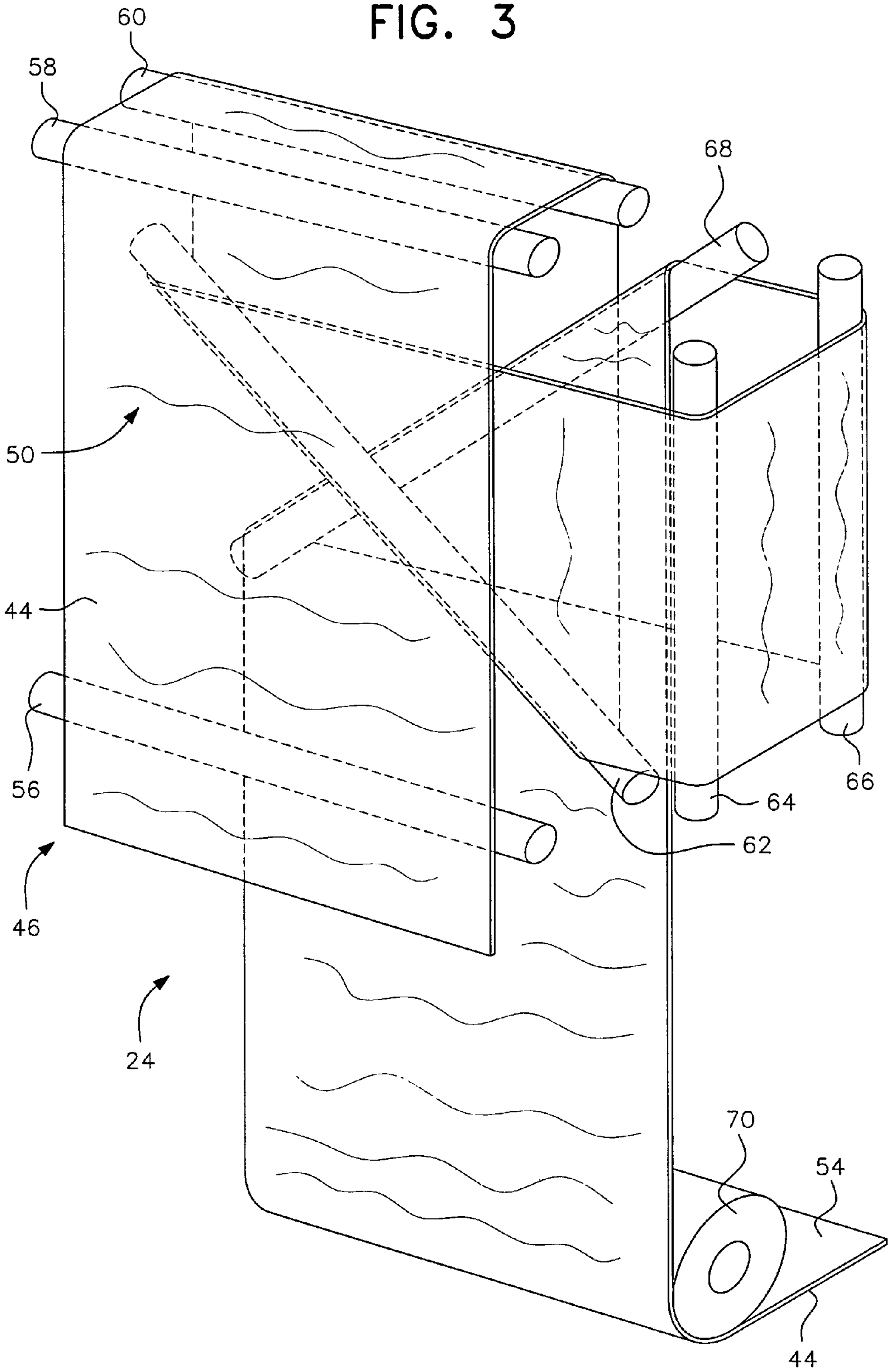
FIG. 3 is an enlarged view of the encircled area labeled as FIG. 3 in FIG. 1.

Turn bar station 24, as shown in FIG. 3, passes the web 46 through a series of web turnover bars so that the indicia 50 appearing on surface 44, when entering the turn bar station 24, is turned through 180 degrees. As a result, the printed surface 46 entering the turn bar station 24 on top of the web exits the turn bar station with the surface 44 facing downwardly or forming the bottom surface of the web, and having upper exposed surface 54 free of any printing of indicia.

The progression of the web 46 through the turn bar station 24 includes the passage along turnover shafts, in succession, shaft 56, shaft 58, shaft 60, angled shaft 62, shaft 64, shaft 66, angled shaft 68 and down to guide roller 70. The turnover shafts are provided with compressed air so that the web moves on an air cushion in the turnover area and friction is diminished. The web turnover device can be adjusted laterally with a side register knob. The air nozzles of the turnover shafts can be sealed by a lever to match the web width to minimize air loss and improve efficiency. A web turnover bar on a rail system as used in the assembly line of the present invention is available under product name Gallus EM 260 from Arsoma Druckmaschinen GmbH of Langgöns-Oberkleen, Germany.

Figure 4:
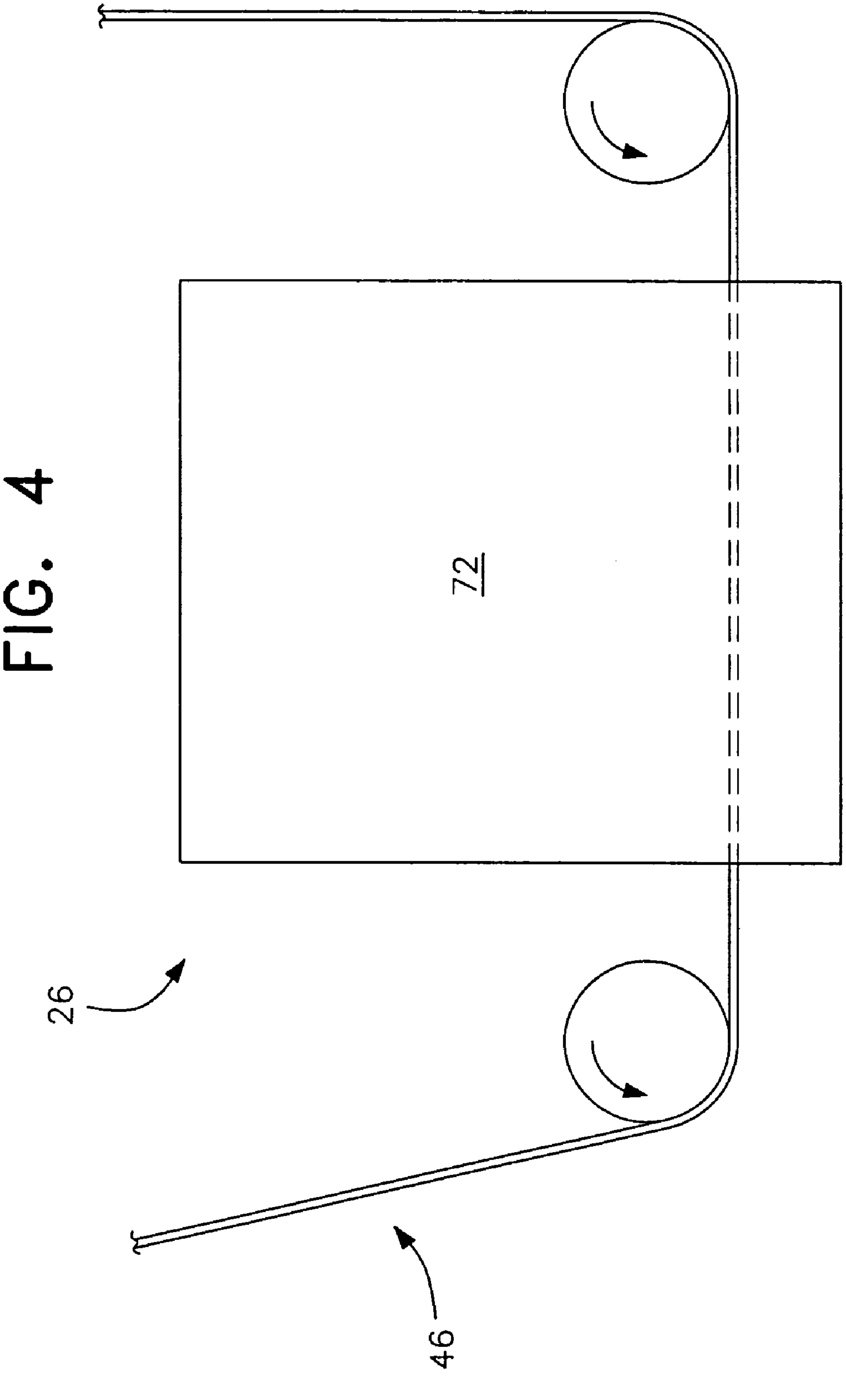
FIG. 4 is an enlarged view of the encircled area labeled as FIG. 4 in FIG. 1
Figure 4A:
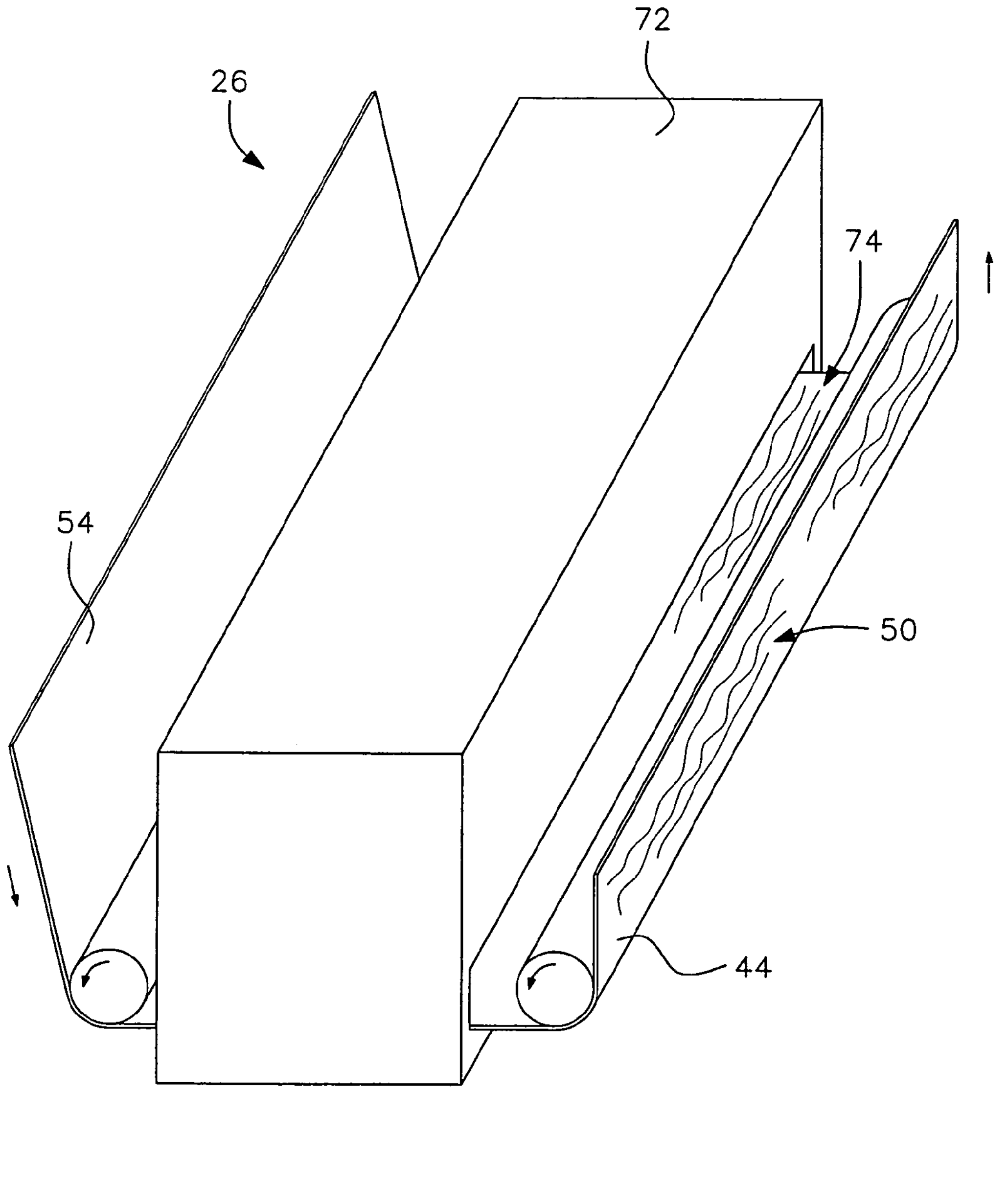
FIG. 4A is a perspective view of the process illustrated in FIG. 4.

As shown in FIGS. 4 and 4A, the web 46 is then passed to another printing station 72 where, in this embodiment, only a portion of the upper surface 54 of the web is printed with indicia 74. The printed portion extends from one lateral edge of the web to a central portion of the web.

Figure 5:
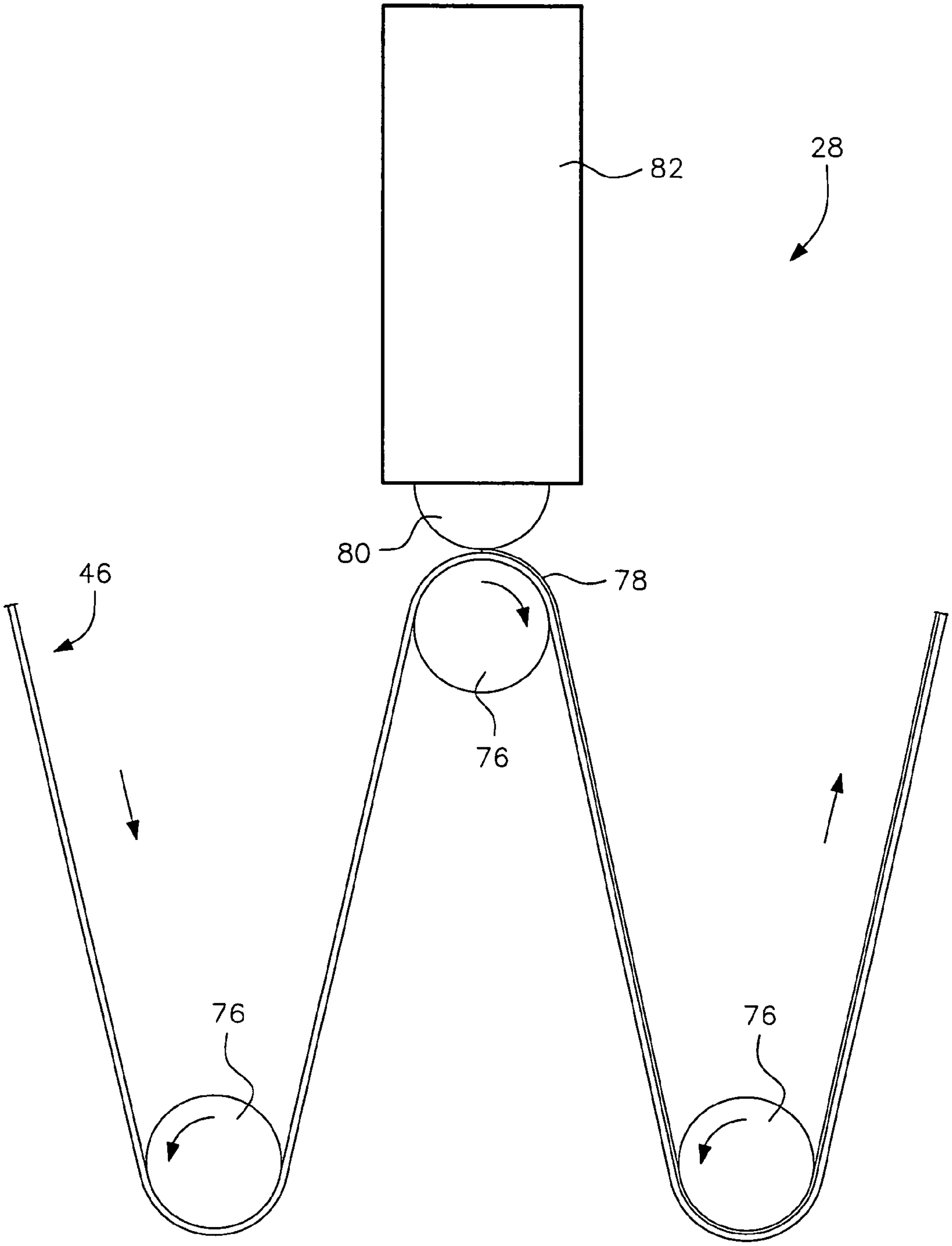
FIG. 5 is an enlarged view of the encircled area labeled as FIG. 5 in FIG. 1.
Figure 5A:
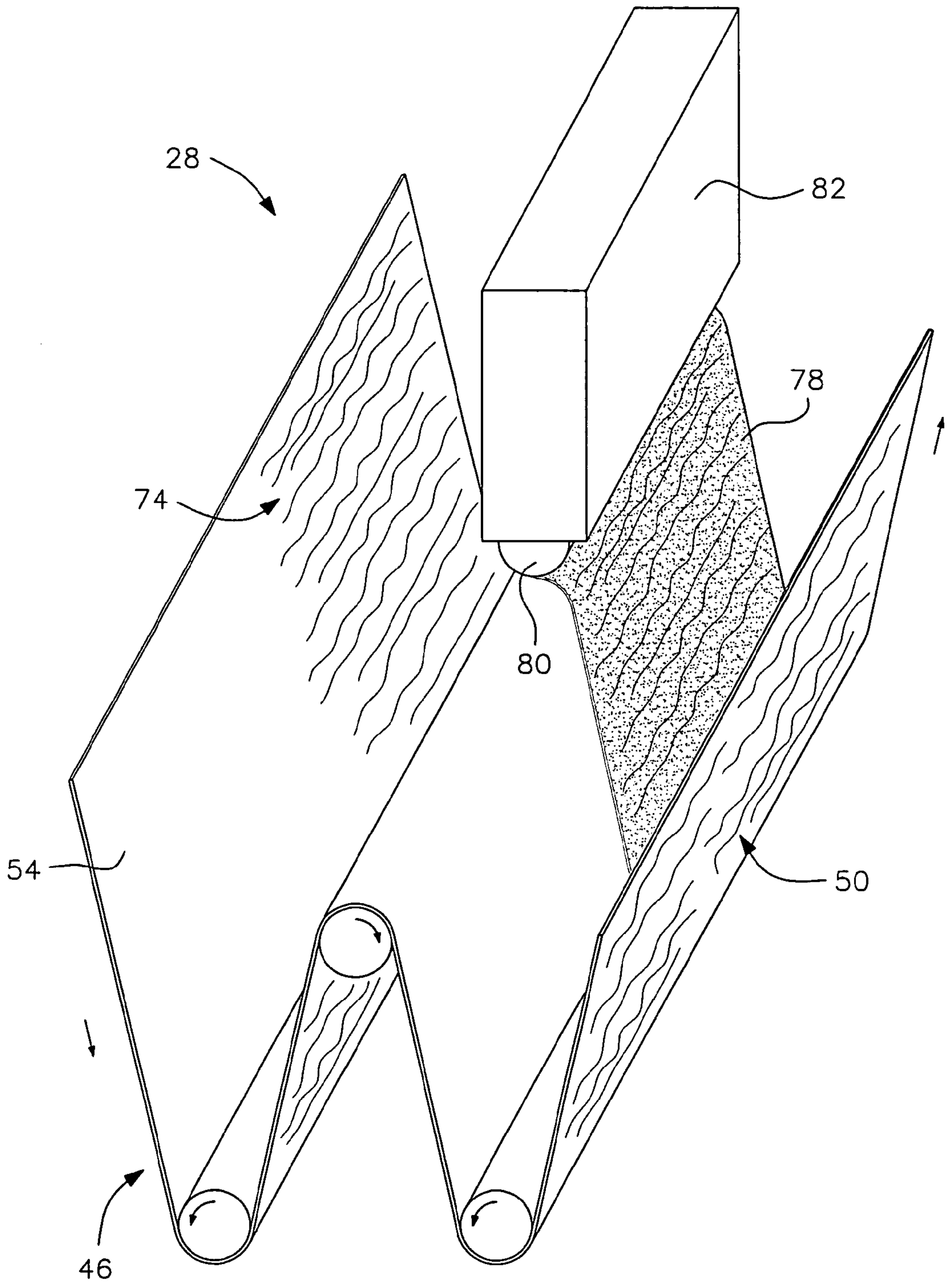
FIG. 5A is a perspective view of the process step illustrated in FIG. 5.
Figure 6:
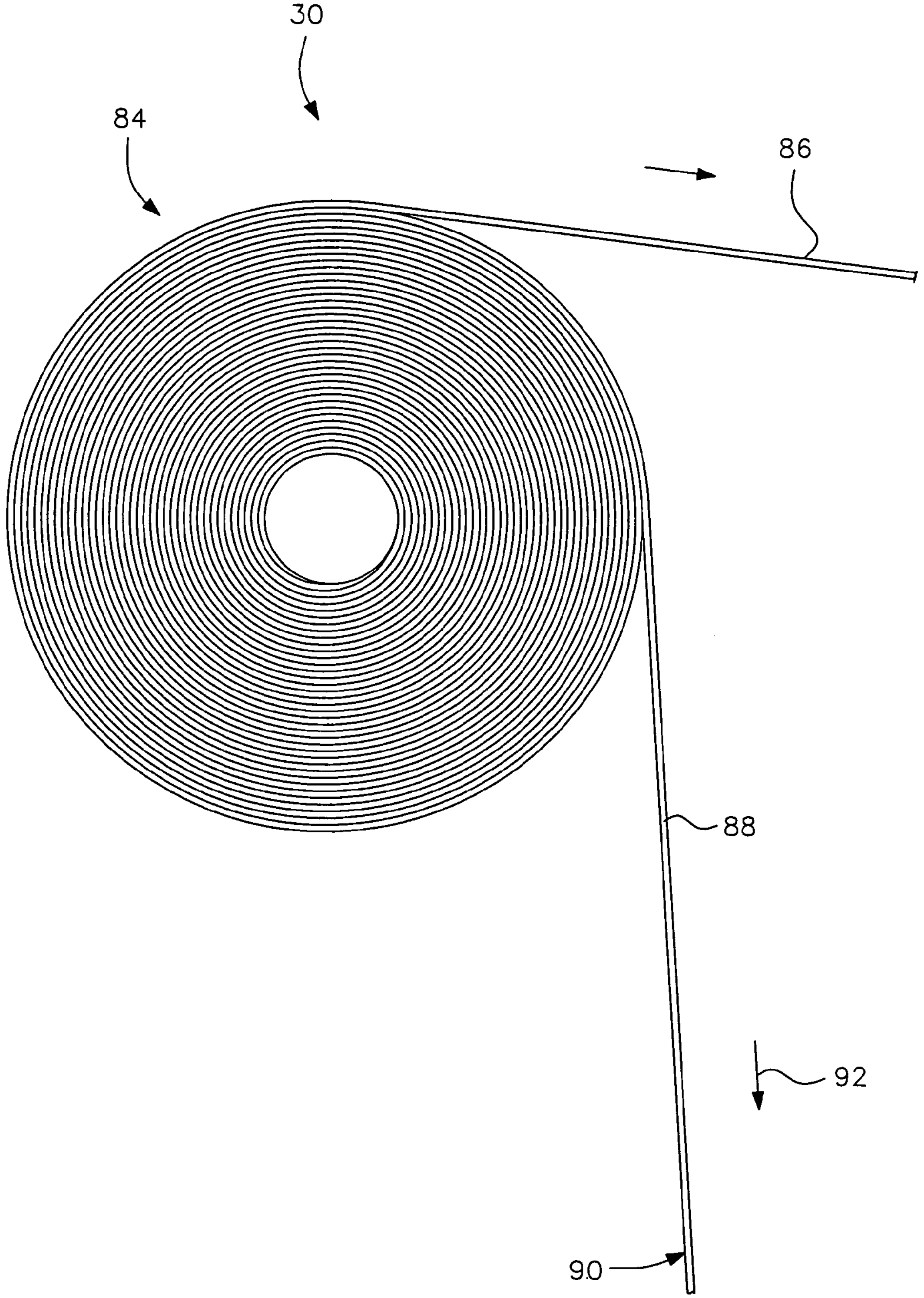
FIG. 6 is an enlarged view of the encircled area labeled as FIG. 6 in FIG. 1.
Figure 6A:
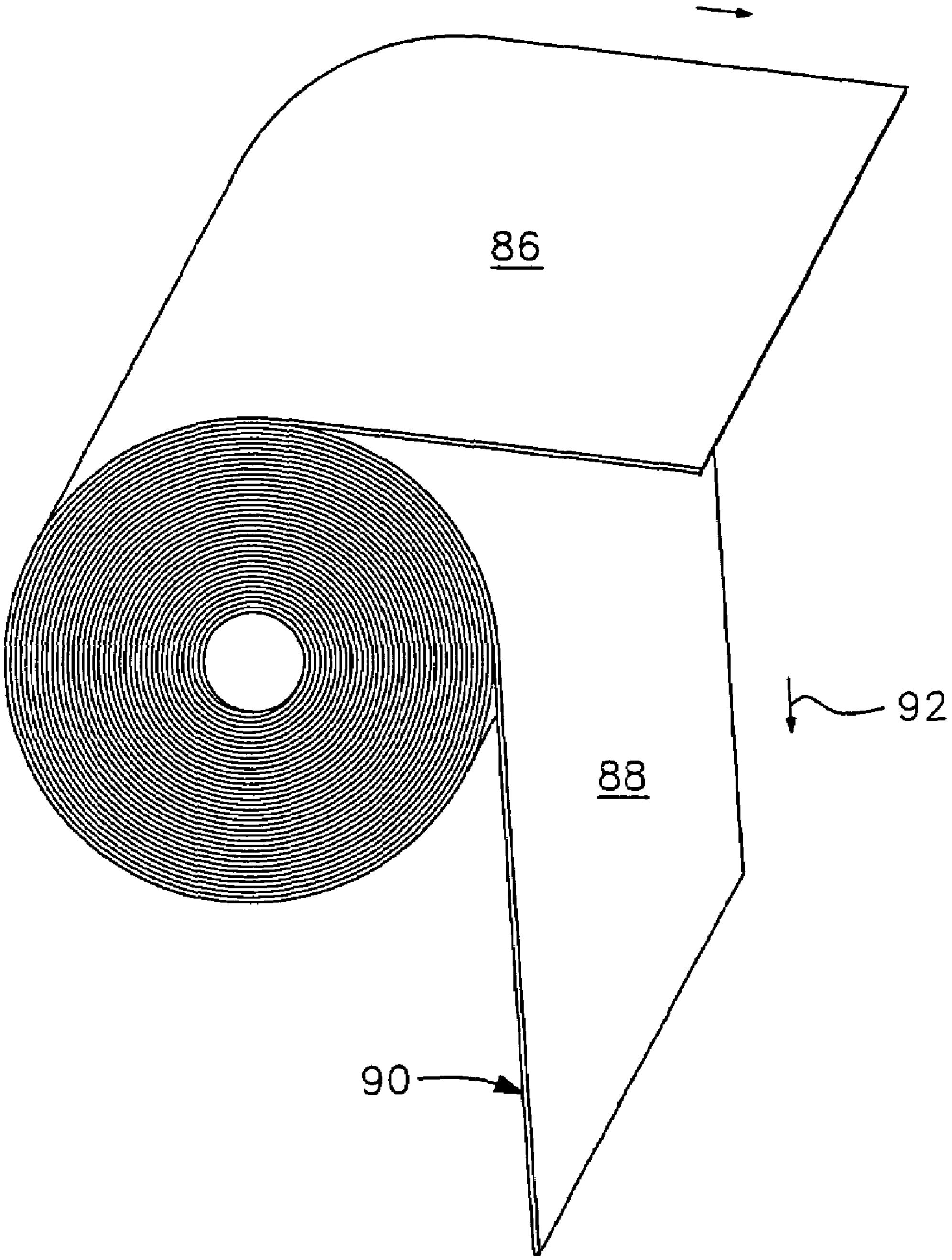
FIG. 6A is a perspective view of the process step illustrated in FIG. 6.

The web 46 then continues to silicone release layer application station 28 as shown in FIGS. 5 and 5A. In this station, as the web 46 passes along a series of guide rollers, a silicone release layer 78 is applied by an application roller 80 rotating within a silicone reservoir 82. As shown in FIG. 5A, the silicone release layer is applied over the indicia 74 applied to the upper surface 54 of the web 46.

As the web continues to move, the web passes an overhead station 30 containing a roll 84 of pressure sensitive adhesive label material. At the overhead station a backing layer 86 and an adhesive layer 88 are separated from one another. The adhesive layer, which comprises a layer of paper having an adhesive coating 90, is moved downward in the direction of arrow 92 toward the in-line manufacturing apparatus.

Figure 7:
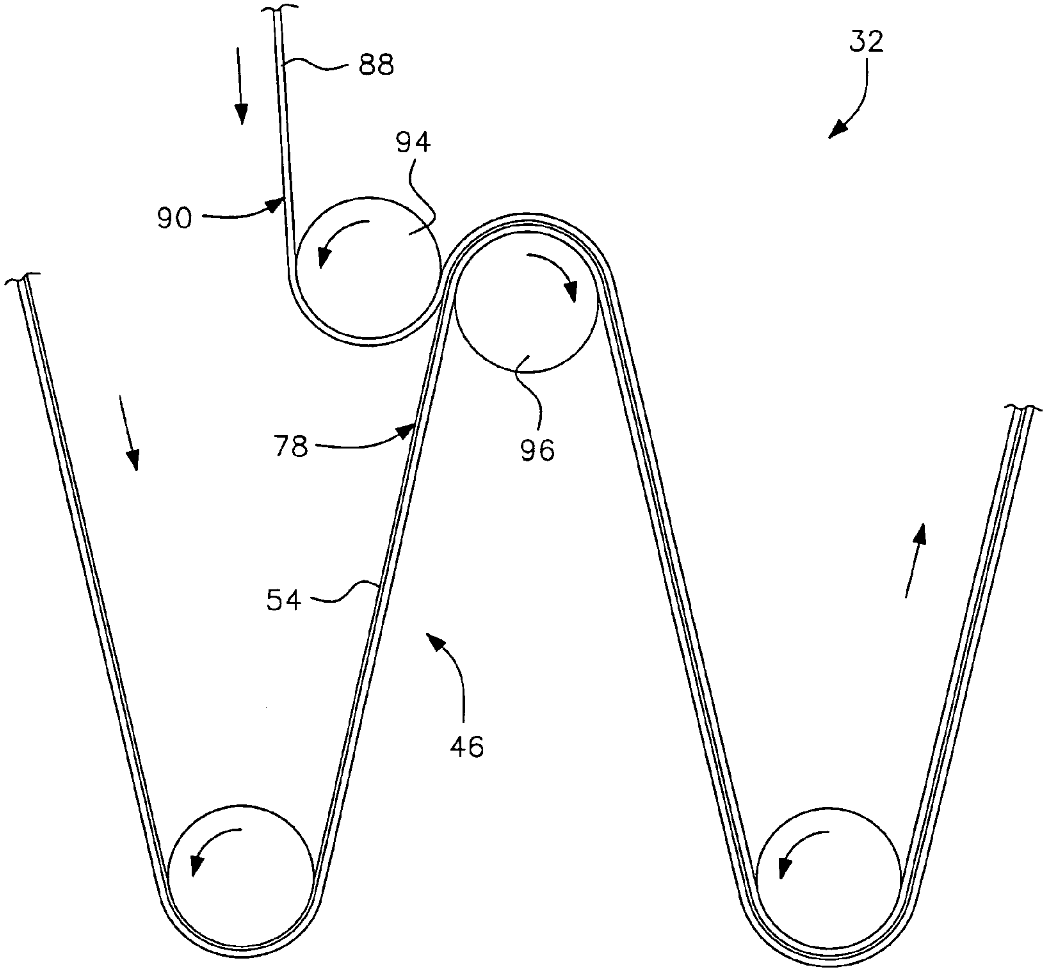
FIG. 7 is an enlarged view of the encircled area labeled as FIG. 7 in FIG. 1.
Figure 7A:
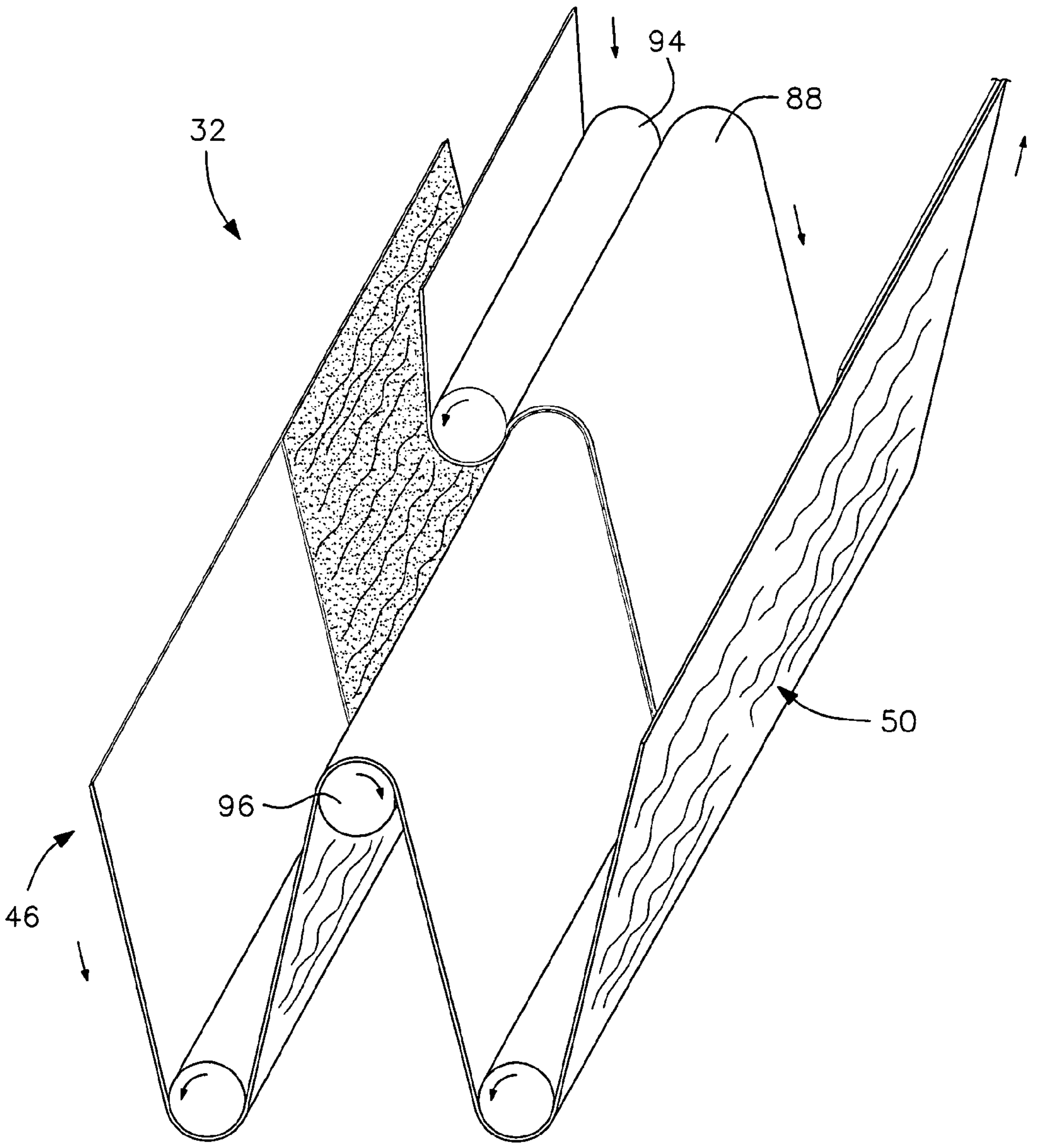
FIG. 7A is a perspective view of the process step illustrated in FIG. 7.

At station 32 as shown in FIGS. 7 and 7A, the adhesive coating 90 of the pressure sensitive adhesive paper 88 passes under guide roller 94 and is applied onto the web 46 on top of the silicone release layer 78 of the upper surface 54 of the web 46. Due to the pressure exerted between guide roller 94 and guide roller 96, the pressure sensitive adhesive label 88 is applied onto the lateral side portion of the web 46 above the printed indicia 74 and silicone release layer 78 as best shown in FIG. 7A.

Alternatively, an adhesive layer may be applied on top of the silicone release layer. This would avoid the necessity for use of pre-formed pressure sensitive label stock material. Bond paper may be applied to the adhesive layer to form a label during the form manufacturing process.

Figure 8:
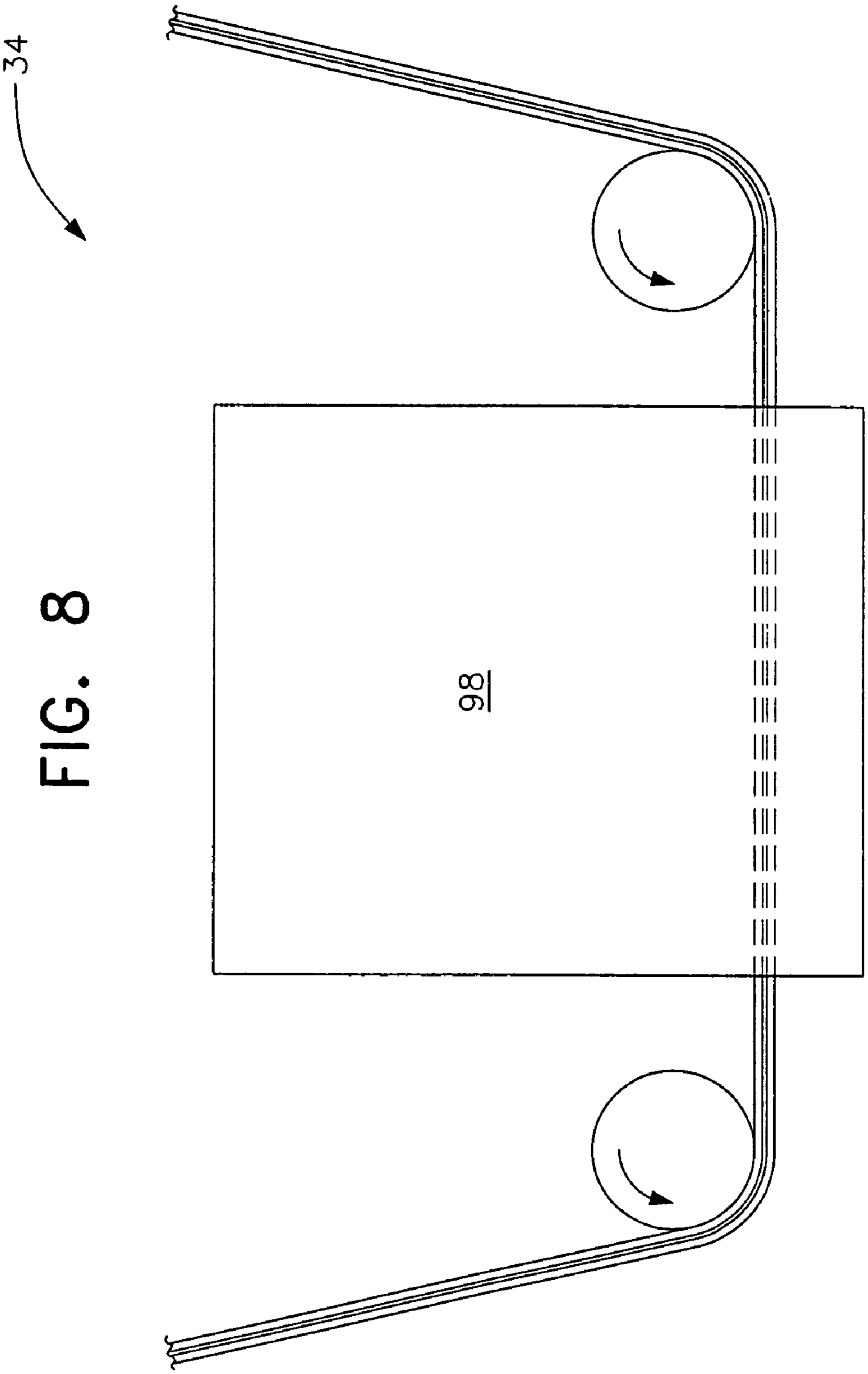
FIG. 8 is an enlarged view of the encircled area labeled as FIG. 8 in FIG. 1.
Figure 8A:
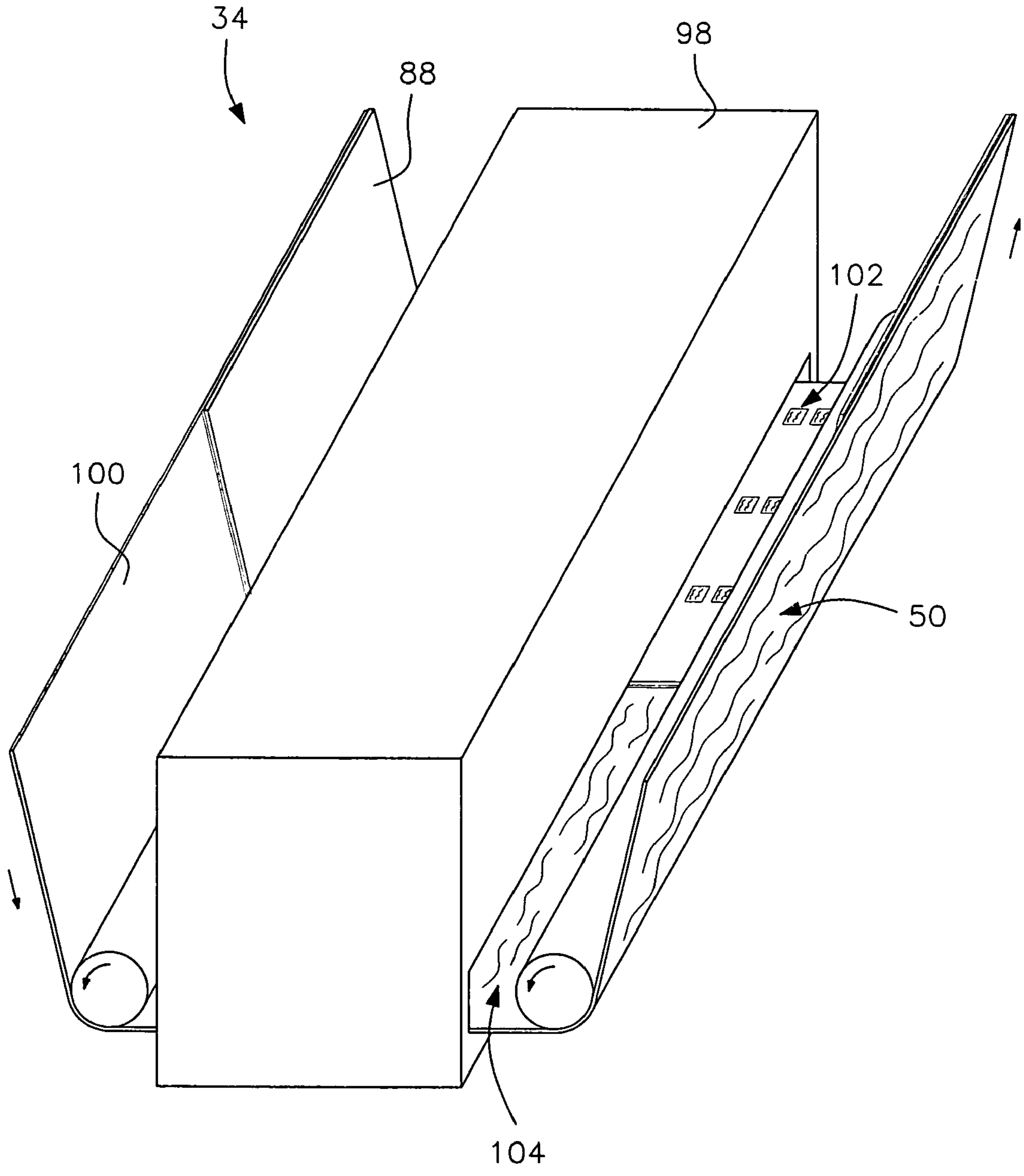
FIG. 8A is a perspective view of the process step illustrated in FIG. 8.

The web 46 then passes to printing station 34 as shown in FIGS. 8 and 8A. At printer 98, printing is performed on both the pressure adhesive label portion 88 as well as on the exposed bond paper portion 100. Printed indicia 102 is applied on the pressure sensitive adhesive label portion 88 and printed indicia 104 is applied on exposed paper portion 100. This produces a 7½×11 inch letter portion and a 7½×11 inch return address label portion. It is understood as being within the scope of the present invention to have alternate dimensioned letter and return address label portions.

Figure 9:
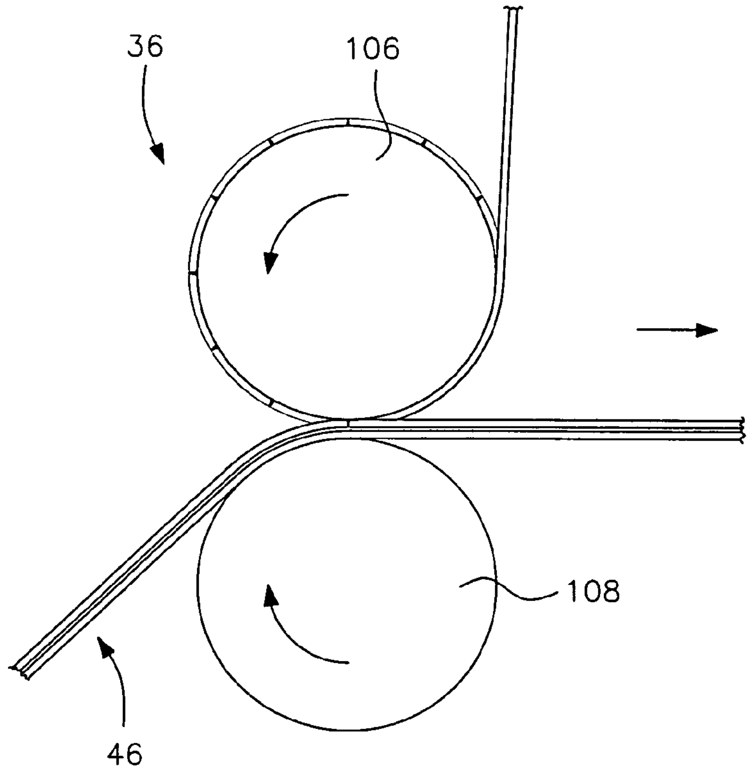
FIG. 9 is an enlarged view of the encircled area labeled as FIG. 9 in FIG. 1.
Figure 9A:
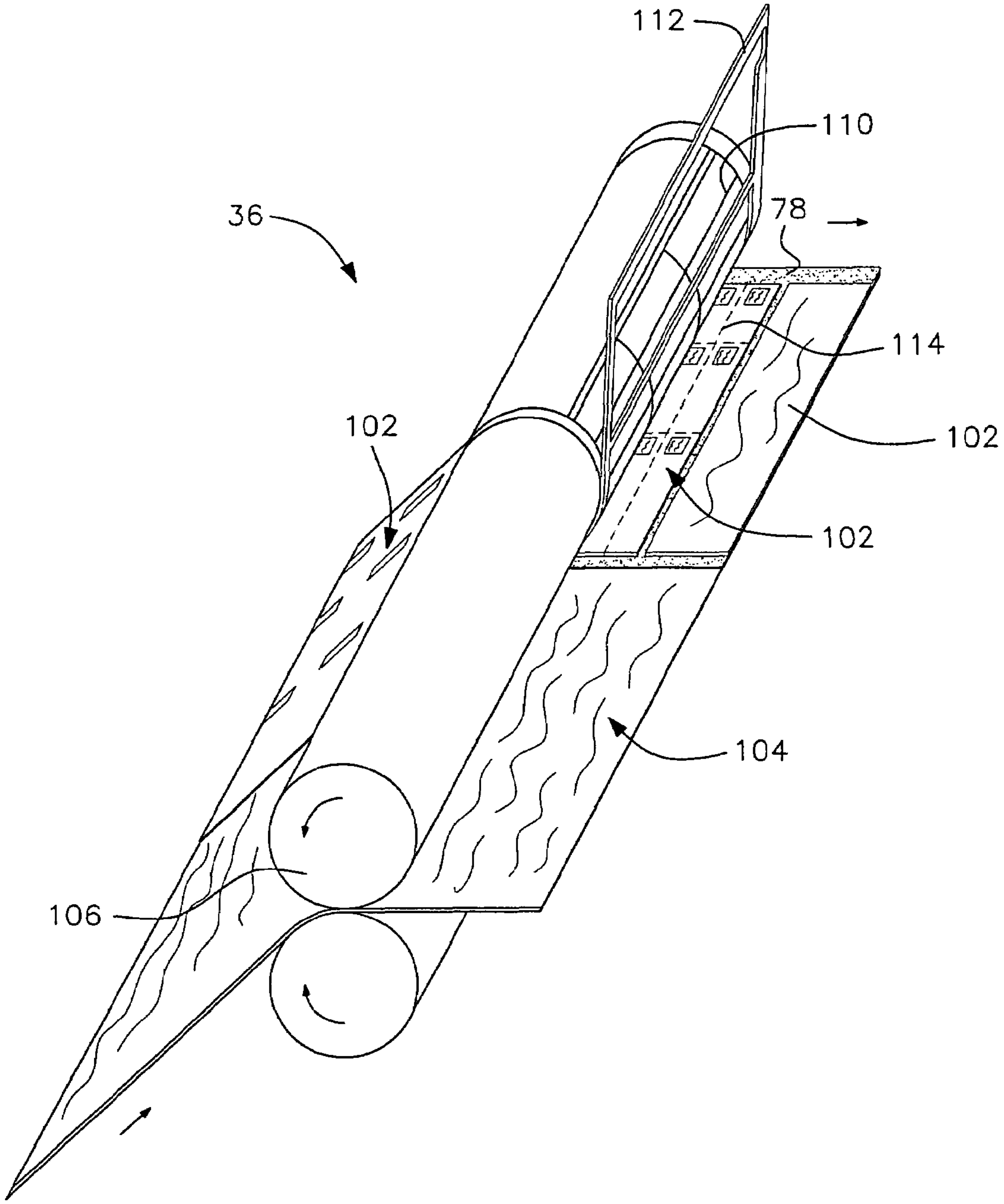
FIG. 9A is a perspective view of the process step illustrated in FIG. 9.

The now nearly finished web is passed to die cut station 36 as shown in FIGS. 9 and 9A where a die cutting roller 106 engages with the web 46 as supported by a backing roller 108. A cutting die 110 is located on the roller 106 only above the portion of the web having the pressure sensitive adhesive label. The die 110 cuts the label portion so as to produce removable waste portions 112 as well as cuts 114 which are sufficient to score the label portion but not of such depth as to cause removal from the label portion with the waste portions 112. Typical of the type of cuts made are those found on adhesive return address labels which are peelable from a release layer. The waste portions 112 are easily removable from the web due to the presence of the silicone release layer 78.

It is understood as being within the scope of the present invention to form any pattern and size of label that may remain on the web as compared to the waste portions 112 which are removed from the web. It is also understood that upon removal of the pressure sensitive labels passing beyond die cut roller 106, the indicia 74 printed at printing station 26 would be exposed to view.

Figure 10:
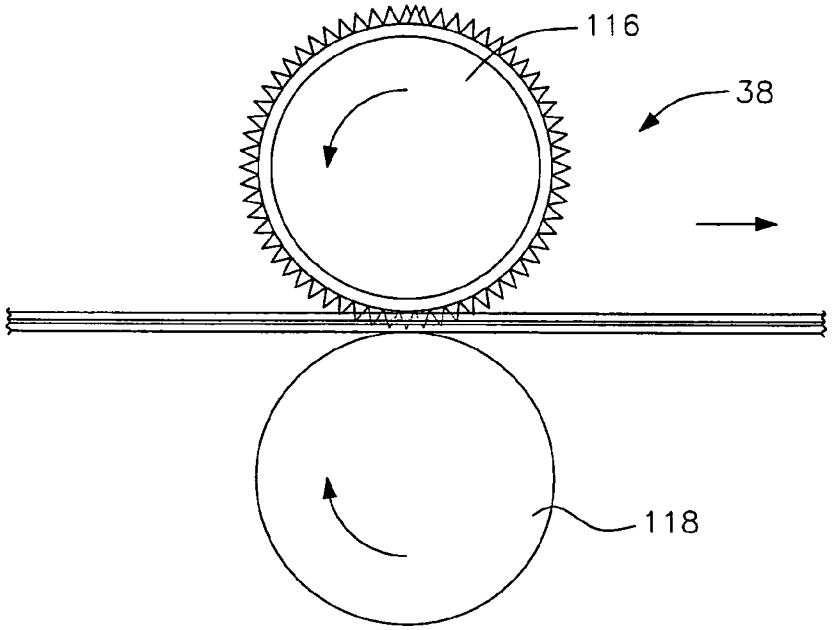
FIG. 10 is an enlarged view of the encircled area labeled as FIG. 10 in FIG. 1.
Figure 10A:
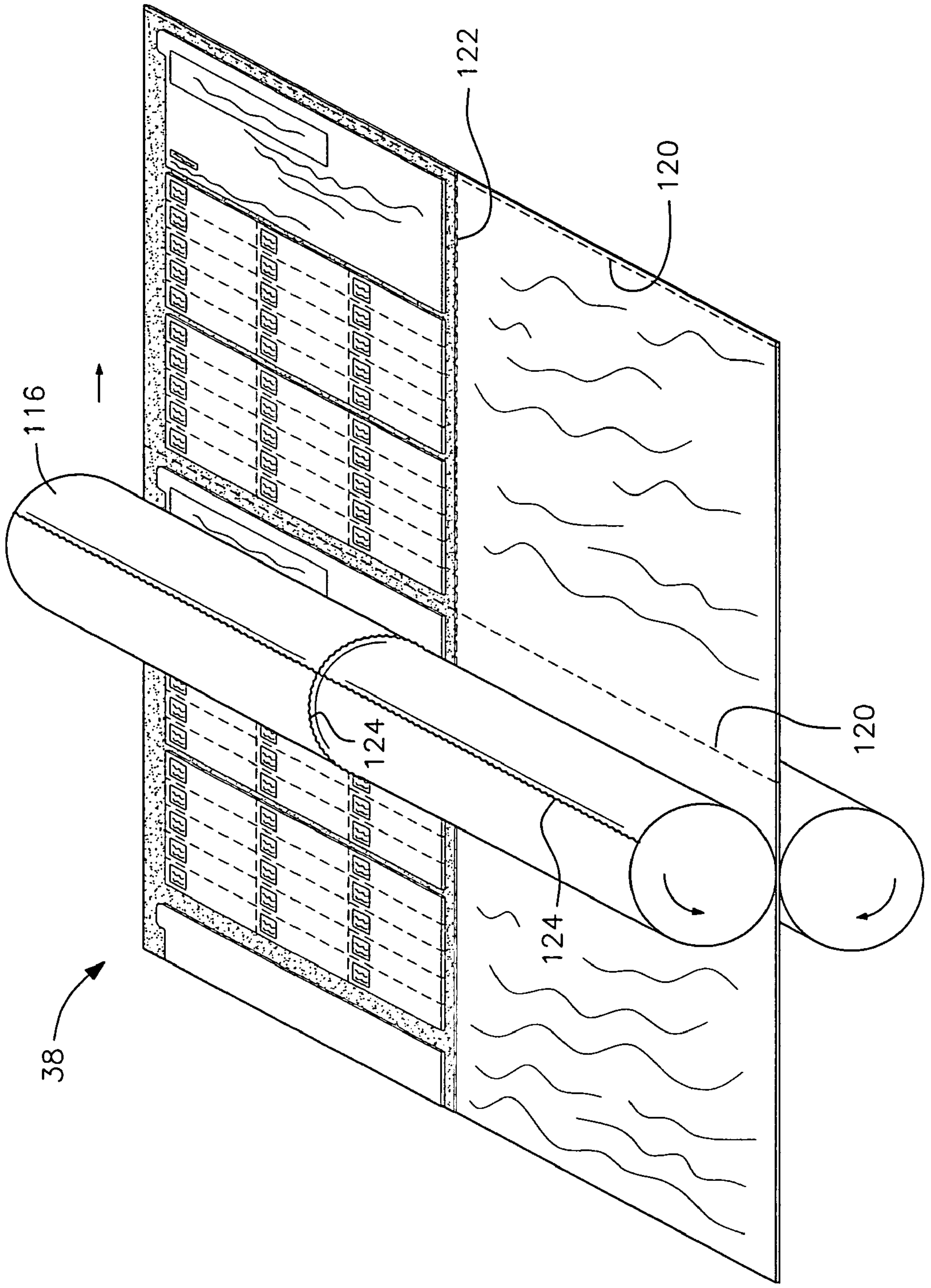
FIG. 10A is a perspective view of the process step illustrated in FIG. 10.

The web then continues to station 38 as shown in FIGS. 10 and 10A where a perforation roller 116 is supported by a backing roller 118. The perforation roller introduces a series of transverse perforations 120 and a longitudinal perforation 122 by the cutting edges 124 of the roller 116.

Figure 11:
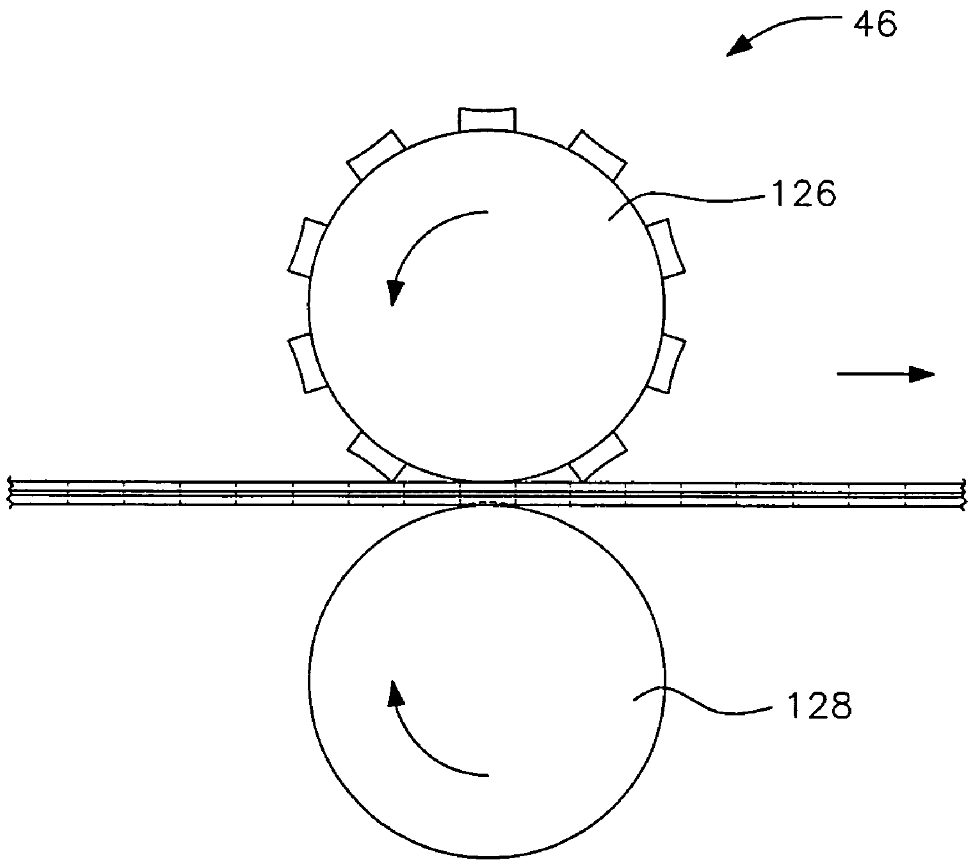
FIG. 11 is an enlarged view of the encircled area labeled as FIG. 11 in FIG. 1.
Figure 11A:
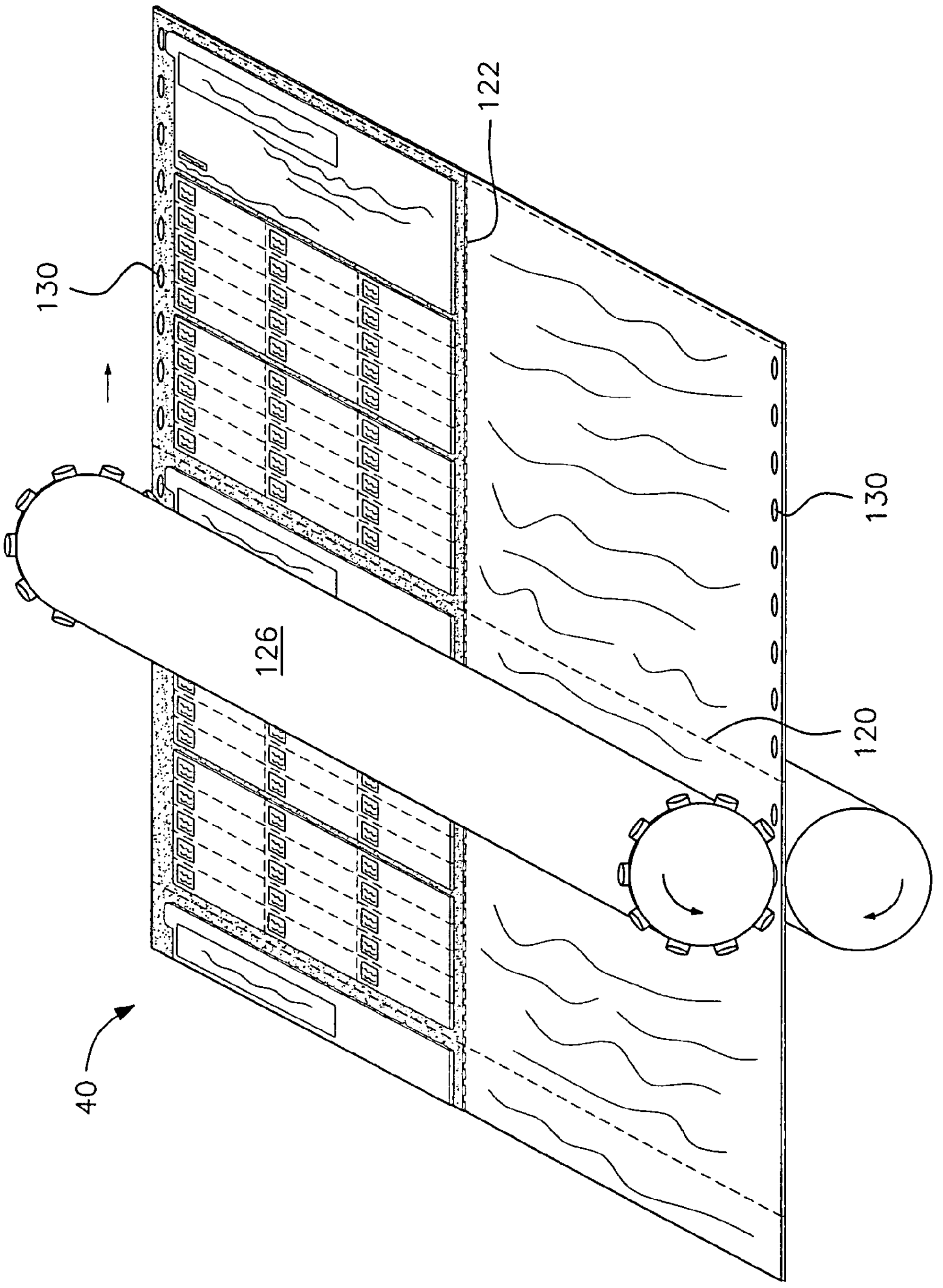
FIG. 11A is a perspective view of the process step illustrated in FIG. 11.
Figure 12:
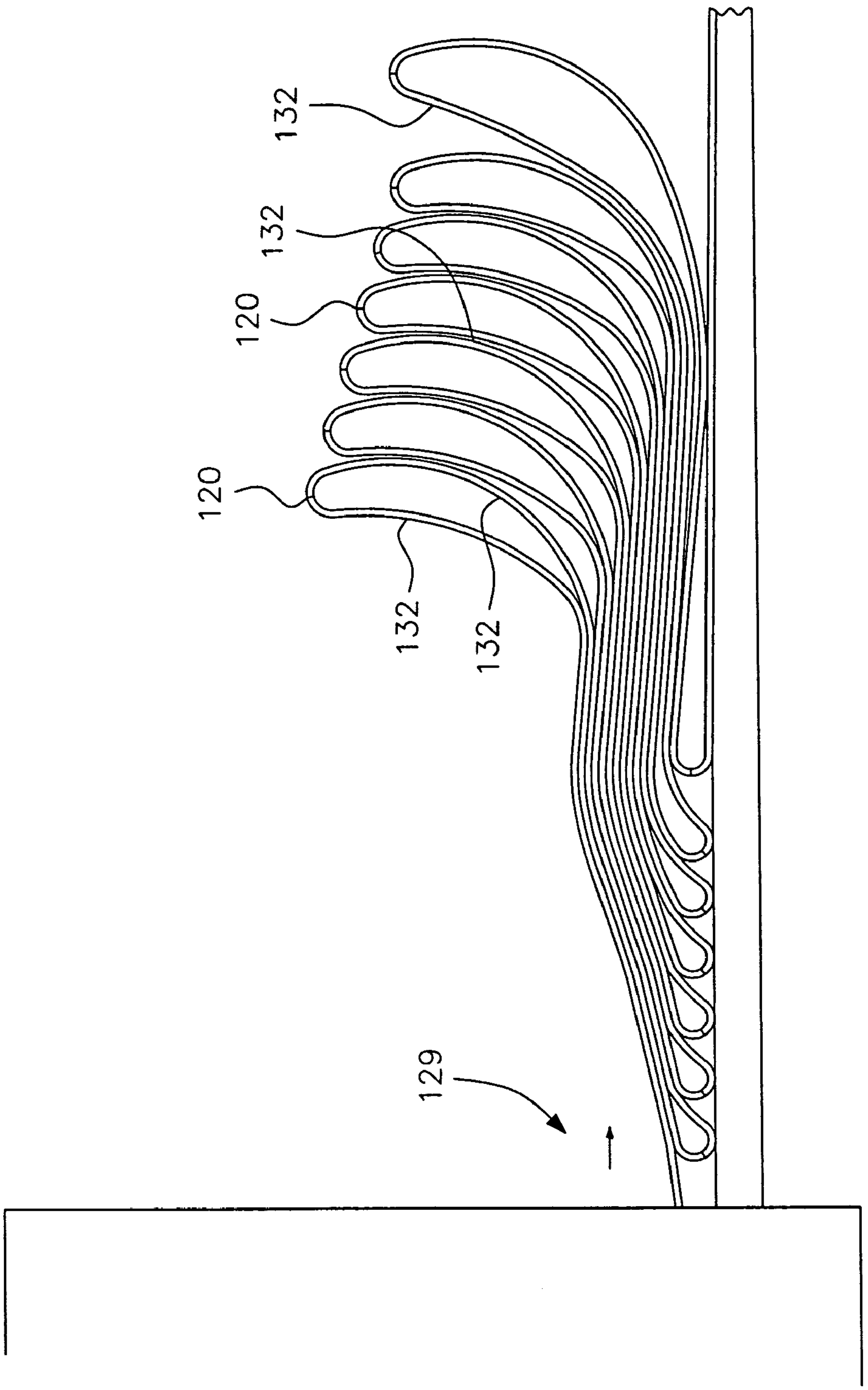
FIG. 12 illustrates a plurality of folded direct mail forms as gathered at an exit end of the assembly line process.

Finally, at station 40, as shown in FIGS. 11 and 11A, a punch roller 126 is supported by a backing roller 128. The punch roller 126 introduces a plurality of tractor feed holes 130 along the lateral edges of the web. Alternatively, the marginal punching may be performed first, followed by the perforating.

At the outlet 129 of the in-line manufacturing assembly a plurality of direct mail forms 132 naturally fold along perforation lines 120. The perforation lines 120 provide for subsequent separation of the forms and individual stuffing in envelopes. The completed forms include all of the individualized information previously produced by two separate printings which must subsequently be matched prior to insertion in an envelope.

Figure 13:
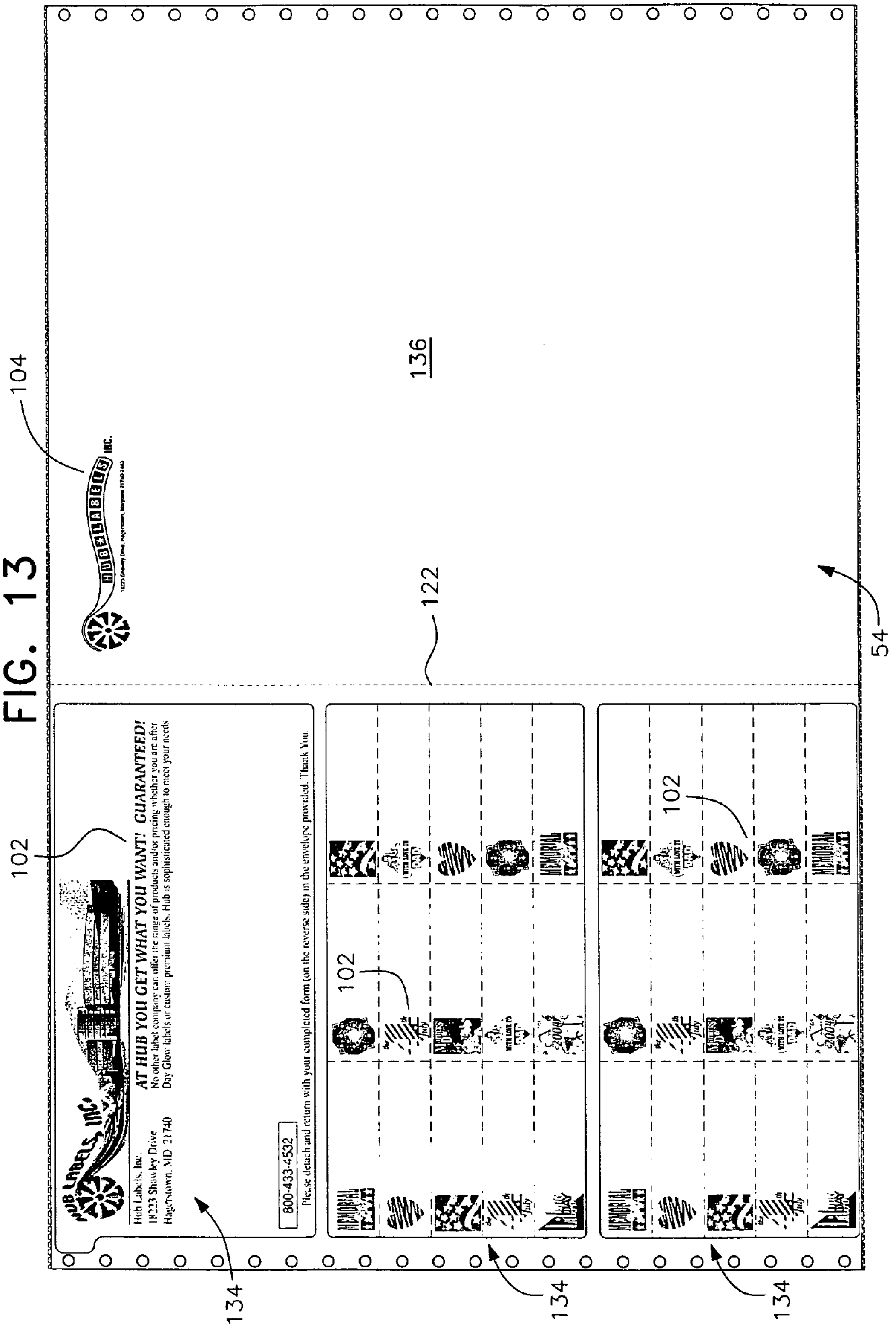
FIG. 13 is a top plan view of a completed direct mail form manufactured according to the process of the present invention, ready for printing on its upper surface.
Figure 14:
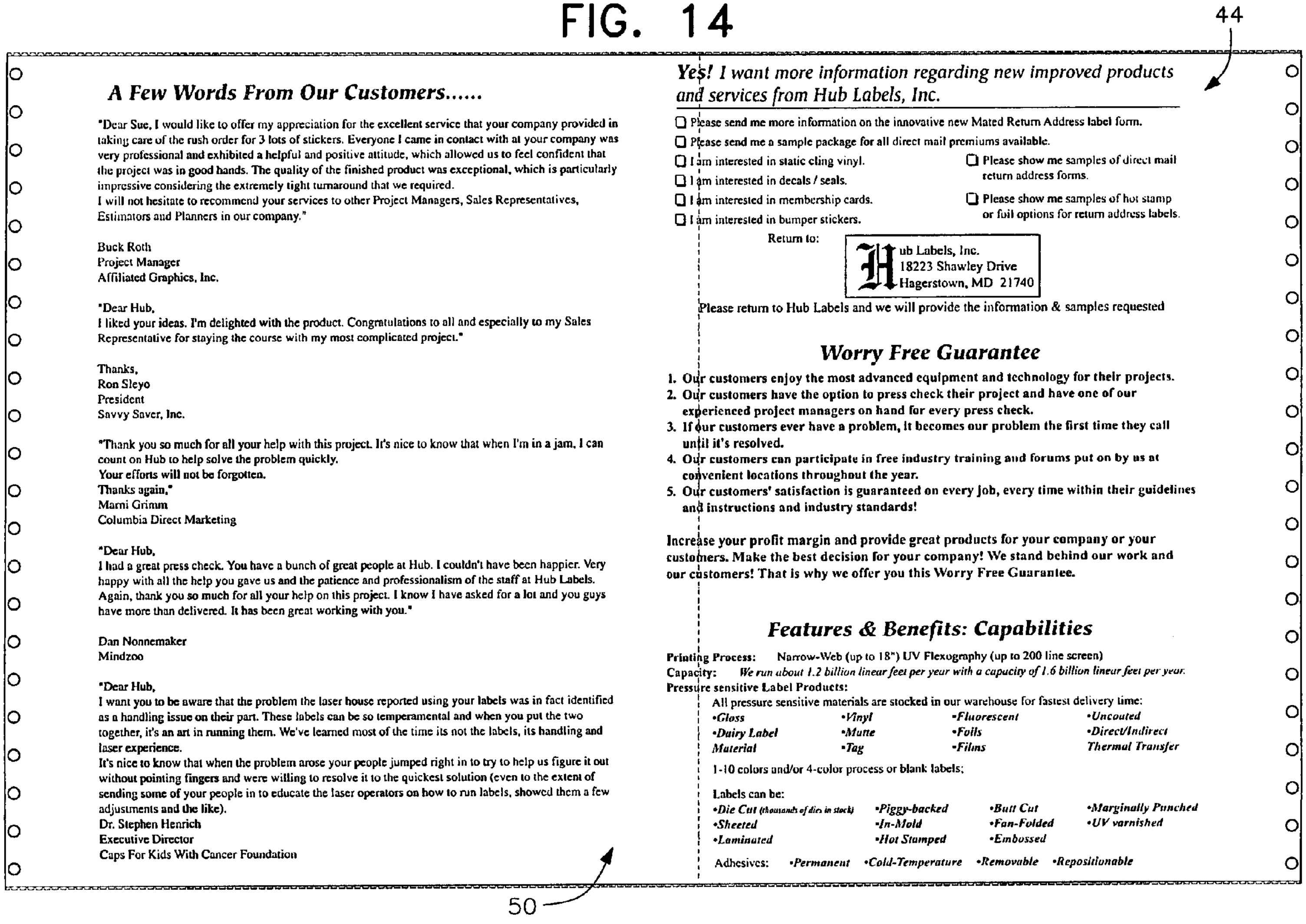
FIG. 14 is a bottom view of the direct mail form shown in FIG. 13, illustrating the printing on the bottom surface of the direct mail form.

As shown in FIG. 13, the upper surface 54 includes a plurality of pressure sensitive adhesive label segments 134 which are separated by the previously present removed waste portions of the pressure sensitive adhesive label. Also, on the opposite side of perforation line 122 is a bond paper portion 136 which may include any individualized message to a direct mail form describer. On the opposite, bottom surface 44 is included indicia 50 as was printed by printer 48.

By the present invention, a direct mail form having a single paper layer extending across the entire width of the form, and having only a portion with pressure sensitive adhesive label segments, can be produced quickly without any of the problems encountered by the prior art. Advantageously, it is possible to also print underneath the pressure sensitive adhesive label portion segments so that upon their removal, additional indicia is exposed.

The foregoing description should be considered as illustrative only of the principles of the invention. Since numerous modifications and changes will readily occur to those skilled in the art, it is not desired to limit the invention to the exact construction and operation shown and described, and, accordingly, all suitable modifications and equivalents may be resorted to, falling within the scope of the invention.

We claim:

1. A direct mail form comprising:

a unitary continuous single planar web layer divided into a plurality of segments by at least two laterally extending perforation lines, each of the segments including two lateral portions on an upper surface of the unitary web layer, only one of the lateral portions including a release coating located on top of an upper surface of said one lateral portion and a layer of pressure sensitive adhesive labels located on top of said release layer of said only one lateral portion, said labels being printed with indicia, said layer of pressure sensitive adhesive labels extending up to and between said laterally extending perforation lines from one of the at least two laterally extending perforation lines to another adjacent one of the at least two laterally extending perforation lines on said only one lateral portion;

the other of the lateral portions being directly printed on with indicia, said two lateral portions being separated from each other by a longitudinally extending perforation line.

2. The direct mail form as claimed in claim 1, wherein said one lateral portion includes printed indicia on the web, below the release layer, for viewing upon removal of the pressure sensitive adhesive label.

3. The direct mail form as claimed in claim 1, wherein the unitary continuous web comprises paper.

4. The direct mail form as claimed in claim 3, wherein the paper is at least 60 pound bond paper.

5. The direct mail form as claimed in claim 1, wherein the release coating is silicone.

6. The direct mail as claimed in claim 1, wherein the web includes printed indicia on a bottom surface of the web.

7. The direct mail form as claimed in claim 1, wherein the web includes a plurality of holes along opposed lateral edges of the web.

8. The direct mail form as claimed in claim 1, wherein said labels are die cut return address labels.

* * * * *